United States Patent [19]

Goldberg

[11] Patent Number: 5,051,977

[45] Date of Patent: Sep. 24, 1991

[54] SCANNING TUNNELING MICROSCOPE MEMORY UTILIZING OPTICAL FLUORESCENCE OF SUBSTRATE FOR READING

[75] Inventor: Harris A. Goldberg, Colonia, N.J.

[73] Assignee: Hoechst Celanese Corp., Somerville, N.J.

[21] Appl. No.: 400,840

[22] Filed: Aug. 30, 1989

[51] Int. Cl.[5] .............. G11C 11/00; G11C 13/00; G11B 9/00

[52] U.S. Cl. .................... 369/126; 365/151; 365/118; 369/101

[58] Field of Search ............ 369/126, 101; 365/114, 365/118, 127, 151, 106

[56] References Cited

U.S. PATENT DOCUMENTS

| | | | |
|---|---|---|---|
| 3,761,895 | 9/1973 | Ellis et al. | 365/114 X |
| 4,471,470 | 9/1984 | Swainson et al. | 365/127 |
| 4,627,029 | 12/1986 | Wilson et al. | 365/127 X |
| 4,785,437 | 11/1988 | Dransfeld | 365/118 X |
| 4,817,053 | 3/1989 | Ikeda et al. | 365/118 X |
| 4,866,672 | 9/1989 | Terao et al. | 365/151 |
| 4,962,480 | 10/1990 | Ooumi et al. | 365/151 |

OTHER PUBLICATIONS

Surface Modification With The Scanning Tunneling Microscope by Abraham et al., 9-86.

Primary Examiner—Stuart S. Levy
Assistant Examiner—Joseph A. Rhoa
Attorney, Agent, or Firm—P. S. Kalyanaraman

[57] ABSTRACT

Provided is a method of reading information contained in an information medium by utilizing a scanning, tunneling microscope in conjunction with a substrate layer which fluoresces when high energy electrons pass into contact therewith. The method comprises providing an information medium comprised of an information layer which contains a track of information bits and the fluorescing substrate layer. A tip of a scanning tunneling microscope is then passed over the information layer, with the resulting fluorescence being measured. By utilizing the unique resolution available from the scanning tunneling microscope and the fluorescence of the substrate layer in order to read the information recorded, a surprisingly accurate and efficient method is achieved for reading highly densified information.

26 Claims, 1 Drawing Sheet

SCANNING TUNNELING MICROSCOPE MEMORY UTILIZING OPTICAL FLUORESCENCE OF SUBSTRATE FOR READING

BACKGROUND OF THE INVENTION

The present invention relates to the reading of information recorded in an information medium. More specifically, the present invention relates to a method of reading information utilizing a scanning tunneling microscope in conjunction with a substrate layer which will fluoresce.

Scanning tunneling microscopy is a fairly recent development, with Gerd Binnig and Heinrich Rohrer having received the 1986 Nobel Prize in physics for its development. While the early designs of this microscope were both cumbersome and delicate, recent improvements have led to scanning tunneling microscope (STM) units which are both compact and robust.

One of the main components of an STM unit is a piezoelectric positioning device that is capable of rastering a sharp metallic tip with sub-nanometer resolution across a sample of interest. The piezoelectric positioner can take many shapes and is often comprised of a set of three orthogonal piezoelectric bars or a single piezoelectric tube which has been sectioned into four quadrants. In addition to moving the tip across the sample, the piezoelectric positioning device must also maintain a constant distance between the tip and sample. This feature of all STMs requires a very sensitive height detector.

In an STM, the height detector relies on the quantum mechanical nature of the tunneling current that flows between the tip and sample. In order to set up a tunneling current, the tip must be about 0.5 nm above the sample. It is well established that the tunneling current varies exponentially with distance such that a change in tip-to-sample distance of 0.1 nm causes about a factor of ten change in tunneling current. This exquisite sensitivity of the tunneling current to the tip-sample separation is used as a feedback signal to the piezoelectric positioner, thus allowing the tip-to-sample separation to be held constant to better than 0.01 nm.

A suitably designed STM unit can be quite small and STMs as small as one centimeter in diameter have been built. The piezoelectric positioner and tip assembly must be carefully isolated from vibrations and this is often accomplished by suspending the STM with spring-like supports. Often, two or three levels of vibration isolation are incorporated. However, by making the physical size of the instrument small and designing the piezoelectric positioner into a highly symmetric holder, the severe requirements on vibration isolation can be reduced to a manageable and easily achievable level.

The second requirement for a stable instrument is a high degree of temperature compensation. This is desirable because even a temperature gradient as small as 0.01K can cause unacceptably large drifts due to the uncontrolled thermal expansion of the piezoelectric positioner. Thus by carefully balancing the thermal expansion of the structural elements of the instrument against the expansion properties of the piezoelectric material, a high degree of temperature compensation can be automatically achieved, resulting in a constant tip-to-sample distance even while operating in an ambient air environment.

Based on recent developments in the design of STM instruments, it is anticipated that smaller, more stable, and more compact scanning assemblies will be developed within the foreseeable future. These STMs will routinely allow experiments at a length scale unimaginable only a few years ago. Of considerable current interest is the ability of the STM to modify in a controlled way the properties of matter at the nanometer length scale. In fact, the physical principles underlying the STM have already provided a means to alter and fabricate structures at the atomic level. Further background and detail with regard to the development and operation of a scanning tunneling microscope is also found in the paper "Scanning Tunneling Microscopy—From Birth to Adolescence", by Gerd Binnig and Heinrich Rohrer, reprinted in *Rev. Mod. Phys.*, Volume 59, No. 3, Part I, July 1987.

Electron tunneling is the phenomenon that underlies the operation of the scanning tunneling microscope. An electron cloud generally occupies a space between the surface of the sample and the needle tip used in the microscope. The cloud is a consequence of the indeterminacy of the electron's location (a result of its wave-like properties). Because the electron is "smeared out", there is a probability that it can lie beyond the surface boundary of a conductor. The density of the electron cloud decreases exponentially with distance. A voltage-induced flow of electrons through the cloud is therefore extremely sensitive to the distance between the surface of the sample, and the scanning needle tip.

To scan the surface, the tip of the needle is pushed toward the sample until the electron clouds of each gently touch. The application of a voltage between the tip and the sample causes electrons to flow through a narrow channel in the electron clouds. This flow is called the tunneling current. A change in the distance between the scanning needle tip and the surface of the sample by an amount equal to the diameter of a single atom causes a tunneling current to change by a factor as much as 1,000. Thus, extremely precise measurements of the vertical positions of the atoms on the sample surface may be obtained.

Due to the extraordinary sensitivity of the scanning tunneling microscope, it has become an important tool in surface science and physics in general. Its primary use has been to obtain atomic-resolution images of surfaces. However, efforts have also been used to manipulate materials as well as image them. See, for example, "Molecular Manipulation Using a Tunneling Microscope", by J.S. Foster, J.E. Frommer and J.C. Arnett, *Nature*, Volume 331, Jan. 28, 1988, Page 324; and, "Atomic-Scale Engineering" by J.B. Pethica, *Nature*, Volume 331, Jan. 28, 1988, Page 301.

In the imaging area, a scanning tunneling microscope has been applied in lithography. For example, lithography with a scanning tunneling microscope has been demonstrated by fabricating submicron lines using a "contamination process" and a Langmuir-Blodgett film as resists. Lithography using metal halide films and polymethylmethacrylate films have also been studied. For example, see McCord and Pease, *J. Vac. Sci. Technol.* B5(1), January/February 1987, Page 430 and *J. Vac. Sci. Technol.* B, Volume 6, No. 1, January/February 1988, Page 293; and, 1/. Z. Li et al., *Appl. Phys. Lett.*, Vol. 54, 1424 (1989).

The high resolution available through the application of a scanning tunneling microscope is certainly a most desirable attribute, and is indeed necessary if information were ever recorded at densities approaching from $10^{12}$ to $10^{14}$ bits/cm$^2$. The spatial resolution realized by use of the scanning tunneling microscope would certainly allow such high density information to be read efficiently and accurately. However, the reading capabilities of a scanning tunneling microscope are too slow for any practical application in mass data storage. This inherent slowness of the device is due to the limited practical rate at which one could successfully modulate the voltage of the scanning tunneling microscope tip. If a method were found which could successfully utilize the resolution of a scanning tunneling microscope, without necessarily suffering from the inherent slowness in voltage modulation, a most impressive system would be obtained.

Accordingly, it is an object of the present invention to provide a method which employs a scanning tunneling microscope in the reading of information available on an information medium.

It is another object of the present invention to employ a novel method of reading information utilizing a scanning tunneling microscope which does not suffer from the inherent slowness of voltage modulation.

It is still a further object of the present invention to provide a method which permits the reading of information with high spatial resolution approaching information densities of from $10^{12}$ to $10^{14}$ bits/cm$^2$.

Another object of the present invention is to provide a method of reading information utilizing a scanning tunneling microscope wherein a substrate layer plays an important role.

These and other objects of the present invention will become apparent upon a review of the following specification and the claims appended thereto.

SUMMARY OF THE INVENTION

In accordance with the foregoing objectives, there is provided by the present invention a novel method of reading the information contained in an information medium by utilizing a scanning tunneling microscope in conjunction with a substrate layer which fluoresces when high energy electrons pass into contact therewith. More specifically, the present invention comprises providing an information medium comprised of an information layer which contains a track of information bits. The information medium also comprises a substrate layer which fluoresces when high energy electrons pass into contact therewith. The tip of a scanning tunneling microscope is then passed over the information layer, and the resulting fluorescence is measured.

In another preferred embodiment, there is provided a method which comprises first providing an information medium comprised of an information layer and a substrate layer which fluoresces when high energy electrons pass into contact therewith. A track of information bits is then recorded into the information layer by a writing process which conjointly employs a scanning tunneling microscope and a modulated, focused light source. By the writing process, controlled areas in the information layer, which correspond to the information bits, are chemically or physically changed to exhibit a different propensity for high energy electrons to tunnel therethrough. The tip of a scanning tunneling microscope is then passed over the information layer, with the resulting fluorescence being measured.

In another preferred embodiment of the present invention, there is provided a system for reading information contained in an information medium. The system comprises a scanning tunneling microscope and an information medium comprised of an information layer containing a track of information bits and a substrate layer which fluoresces when a high energy electron passes into contact therewith. The scanning tunneling microscope and information medium are positioned such that the electron cloud of the tip of the scanning tunneling microscope gently touches the electron cloud of the information layer of said information medium. Means are also provided for passing the tip of said scanning tunneling microscope over the surface of the information layer while the scanning tunneling microscope and information layer are in such a position. In a most preferred embodiment, the substrate layer is comprised of GaAs.

BRIEF DESCRIPTION OF DRAWING

The invention is described in detail below with reference to the single FIGURE which is a schematic view of an apparatus constructed in accordance with the present invention.

DETAILED DESCRIPTION OF THE PREFERRED EMBODIMENTS

Figure 1:
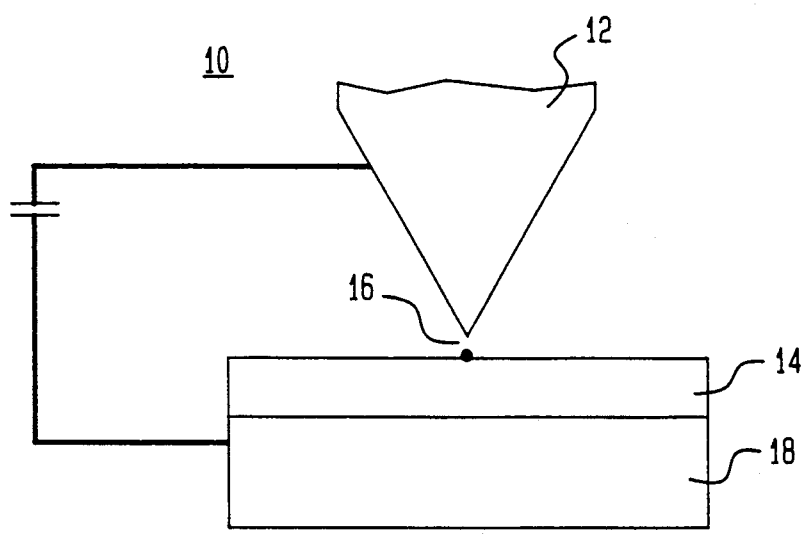

The present invention utilizes the combination of a scanning tunneling microscope with a substrate layer which fluoresces when high energy electrons pass into contact therewith. By utilizing the unique resolution available from the scanning tunneling microscope, and the fluorescence of the substrate layer in order to read the information recorded in the information layer of the information medium, a surprisingly accurate and efficient method is achieved for reading highly densified information without suffering the disadvantages of having to modulate the scanning tunneling microscope.

The scanning tunneling microscope indicated at 10 employed in the method of the present invention is the instrument developed by Gerd Binnig and Heinrich Rohrer, or any similar device. The tip 12 of the needle of the scanning tunneling microscope is pushed toward the information layer 14 until the electron clouds of each gently touch. The application of a voltage between the tip and the information medium causes electrons to flow through a narrow channel indicated at 16 in the electron cloud. It is this flow which is the tunneling current. In the method of the present invention for reading the information contained in the information layer, the voltage applied is generally under ten volts, and is typically around one volt. The particular voltage, of course, will depend upon the particular constituency of the information layer, i.e., the particular type of material employed therein.

The application of the voltage is generally maintained at a constant level. Modulation of the voltage is preferably avoided to the extent possible. The real advantage of using the scanning tunneling microscope is its resolution, and hence its ability to read highly densified recorded information. The resolution available when using a diode laser is generally from 2,000 angstroms to 1 micron. By using the scanning tunneling microscope, a resolution ranging from 10 to 500 angstroms, and preferably from 10 to 100 angstroms (in linear length of the information bit) can be realized. Thus, the scanning tunneling microscope can accurately and efficiently read information recorded in a density ranging from $10^{12}$ to $10^{14}$ bits per square centimeter, i.e., 1000–100,000 gigabytes per square centimeter.

The information medium employed has as its top most layer the information layer. It is preferred that the information medium is of a disk format, and that the information track is of a circular nature, e.g., as in an optical disk. The information layer can be comprised of any appropriate material, but generally comprises some dye material. It is most preferred that the information layer be comprised of a material which can be depleted, or chemically or physically changed, by a suitable writing process in controlled areas which correspond to the information bit. The chemical or physical change which can occur in the information layer is such that the changed areas exhibit a different propensity for having high energy electrons tunnel therethrough. In other words, once the chemical or physical change has occurred, a high energy electron such as that received from a scanning tunneling microscope, is less likely or more likely to tunnel through the changed area (i.e., the information bit) than an area of the information layer which has not been changed. For the purposes of the present invention, the high energy electrons being more likely or less likely to tunnel through the information layer, is meant that the electrons are either more or less likely to be able to travel through the information layer without substantial energy loss.

The information medium employed must also contain a substrate layer 18 which fluoresces when high energy electrons pass into contact therewith, i.e., when high energy electrons tunnel into the substrate layer. By substrate layer, for the purposes of the present invention, is meant a layer beneath the information layer. The substrate layer can act as the substrate or lowest supporting layer of the information medium, or it can be one of several substrate layers, with an additional, different layer acting as a support for even the fluorescing substrate layer. It is preferred, of course, that the substrate layer of the present invention which will fluoresce be directly beneath the information layer.

The substrate layer which fluoresces can be any suitable material meeting the qualification that the layer fluoresces when high energy electrons come into contact with the layer, i.e., high energy electrons tunneling into it. In a most preferred embodiment, the substrate layer is comprised of GaAs. A substrate layer comprised of GaAs exhibits properties necessary for the practice of the present invention, as GaAs will fluoresce when a high energy electron tunnels into it. The availability of GaAs also makes it a most preferred substrate layer.

The information medium also comprises a track of information bits in the information layer. This track of information bits can be established by any conventional method known to the art. As well, a track of information bits can be achieved by employment of scanning tunneling microscope. It is most preferred, however, that the information is recorded in the information layer by conjointly employing a scanning tunneling microscope and a modulated, focused light source. Such a method is described in copending, commonly assigned U.S. Ser. No. 400,841.

For example, when a scanning tunneling microscope is used in conjunction with a modulated, focused light source, the tip of the scanning tunneling microscope is passed over the surface of the information medium in conjunction with the light from the focused light source being irradiated upon the tip of the scanning tunneling microscope and/or the surface of the information medium. The focused light source is modulated in accordance with the information to be recorded such that a chemical or physical change is induced in the information layer of the medium, or the material in the information layer is depleted in the controlled areas, to thereby create a track of recorded bits of information. It is only upon sufficient energy being imparted by the combination of the scanning tunneling microscope and the focused light that the information is actually recorded in the information medium. In those places on the information medium in which information is not to be written, the modulation of the focused light source is such that the amount of energy imparted by the combination of the scanning tunneling microscope and the focused light source is insufficient to induce a chemical or physical change.

As discussed previously, the change in the information layer is one of depletion, or chemical or physical modification of the layer, such that the areas in which the writing has occurred exhibit a different propensity for high energy electrons to tunnel therethrough as compared to the areas of the information layer in which writing has not occurred. It is most preferred that the writing be via chemical modification, and that the writing occur on a molecular level.

In the reading of the recorded information, the tip of the scanning tunneling microscope is passed over the track of information bits, with the voltage applied being constant. The voltage must, however, be sufficient to cause tunneling of the high energy electrons into the substrate layer to thereby cause fluorescence by the substrate layer in those areas corresponding to the bits of information. By applying a constant voltage to the scanning tunneling microscope, and relying upon the fluorescence of the substrate layer, the disadvantage of having to modulate the scanning tunneling microscope is avoided. Rather, the scanning tunneling microscope can be quickly passed over the track of information bits, with the fluorescence being read by suitable and conventional equipment, as is well known to one skilled in the art.

While the invention has been described with preferred embodiments, it is to be understood that variations and modifications may be resorted to as will be apparent to those skilled in the art. Such variations and modifications ar to be considered within the purview and the scope of the claims appended hereto.

What is claimed is:

1. A method of reading information contained in an information medium, wherein the method comprises
   providing an information medium comprised of an information layer which contains a track of information bits and a substrate layer which fluoresces when high energy electrons pass into contact therewith,
   passing the tip of a scanning tunneling microscope over the information layer, and
   measuring the resulting fluorescence.

2. The method of claim 1 wherein the information bits exist as areas in the information layer wherein the material of the information layer has been depleted by a writing process or has been chemically or physically changed by a writing process.

3. The method of claim 2, wherein the track of information bits in the information layer of the information medium is provided by conjointly employing a scanning tunneling microscope and a modulated, focused light source.

4. The method of claim 2, wherein the track of information bits in the information layer of the information medium is provided by employment of a scanning tunneling microscope.

5. The method of claim 2, wherein the substrate layer is comprised of GaAs.

6. The method of claim 2, wherein the information bits exist as areas in the information layer wherein the material of the information layer has been depleted by a writing process and information is read as an increase in fluorescence.

7. The method of claim 6 wherein the substrate layer is comprised of GaAs.

8. The method of claim 2, wherein the information bits exist as areas in the information layer wherein the material of the information layer has been chemically or physically changed by a writing process so that high energy electrons can less easily tunnel through the information layer to the substrate, and information is read as a decrease in fluorescence.

9. The method of claim 2, wherein the information bits exist as areas in the information layer wherein the material of the information layer has been chemically or physically changed by a writing process so that high energy electrons can less easily tunnel through the information layer to the substrate, and information is read as a increase in fluorescence.

10. The method of claim 2, wherein the information bits exist as areas in the information layer wherein the material of the information layer has been chemically changed by a writing process.

11. The method of claim 10, wherein the substrate layer is comprised of GaAs.

12. The method of claim 1 wherein the substrate layer is comprised of GaAs.

13. The method of claim 1, wherein the track of information bits in the information layer in the information medium is provided by conjointly employing a scanning tunneling microscope and a modulated, focused light source.

14. The method of claim 1, wherein the track of information bits in the information layer of the information medium is provided by employing a scanning tunneling microscope.

15. A method which comprises
providing an information medium comprised of an information layer and a substrate layer which fluoresces when high energy electrons pass into contact therewith,
chemically or physically changing controlled areas in the information layer to areas exhibiting a different propensity for high energy electrons to tunnel therethrough by a writing process which conjointly employs a scanning tunneling microscope and a modulated, focused light such that a track of information bits is established in the information layer of the information medium,
passing the tip of a scanning tunneling microscope over the information layer, and
measuring the resulting fluorescence 16. The method of claim 15, wherein the substrate layer is comprised of GaAs.

17. The method of claim 15, wherein the information layer is chemically or physically changed by the writing process so that high energy electrons can tunnel less easily through the information layer to the substrate, and information is read as a decrease in fluorescence.

18. The method of claim 17, wherein the substrate layer is comprised of GaAs.

19. The method of claim 15, wherein the information layer is chemically or physically changed by the writing process so that high energy electrons can tunnel more easily through the information layer to the substrate, and the information is read as an increase in fluorescence.

20. The method of claim 19, wherein the substrate layer is comprised of GaAs.

21. A system for reading information contained in an information medium comprising
a scanning tunneling microscope and
an information medium comprised of (i) an information layer containing a track of information bits and (ii) a substrate layer which fluoresces when high energy electrons pass into contact therewith,
wherein the scanning tunneling microscope and the information medium are positioned such that the electron cloud of the tip of the scanning tunneling microscope gently touches the electron cloud of the information layer of said information medium, with means for passing the tip of said scanning tunneling microscope over the surface of the information layer while the scanning tunneling microscope and information layer are in such position.

22. The system of claim 21, wherein the substrate layer is comprised of GaAs.

23. The system of claim 21, wherein the substrate layer is supported by an additional layer.

24. The system of claim 23, wherein the substrate layer is comprised of GaAs.

25. The system of claim 21, wherein the information layer contains a dye material.

26. The system of claim 25, wherein the information layer contains a dye material which does not fluoresce.

* * * * *